Figure 1:
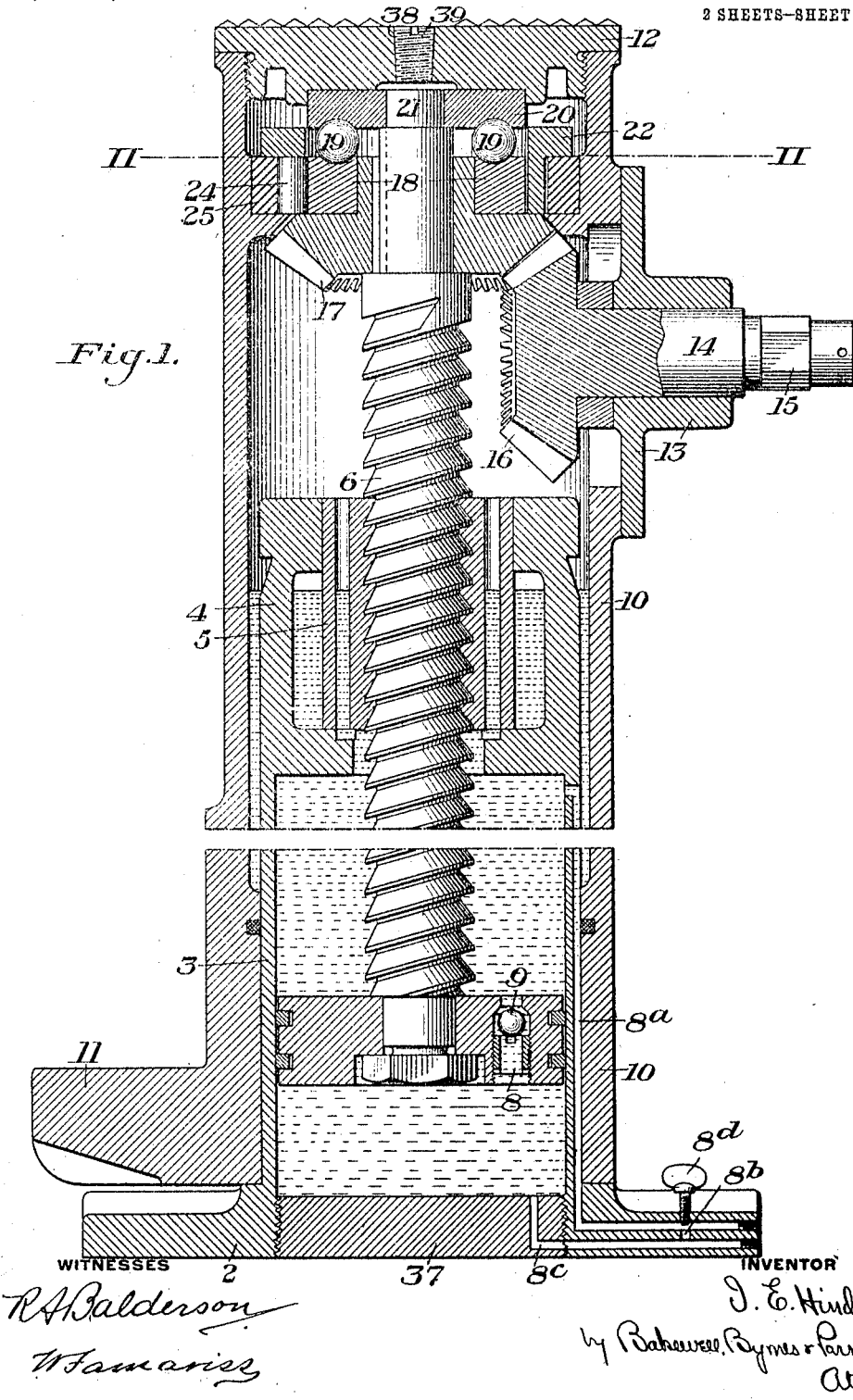

I. E. HINDMAN.
LIFTING JACK.
APPLICATION FILED MAY 24, 1912.

1,054,413.

Patented Feb. 25, 1913.

2 SHEETS—SHEET 1.

WITNESSES
R. A. Balderson
W. F. Amaries

INVENTOR
I. E. Hindman
by Bakewell, Byrnes & Parmelee
Attys.

I. E. HINDMAN.
LIFTING JACK.
APPLICATION FILED MAY 24, 1912.
1,054,413.
Patented Feb. 25, 1913.
2 SHEETS—SHEET 2.
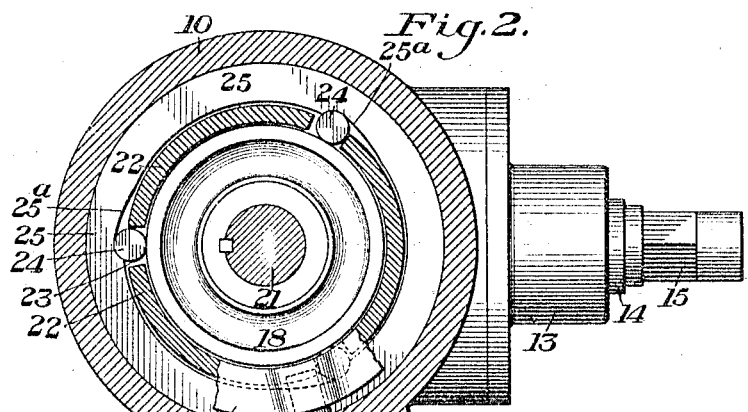
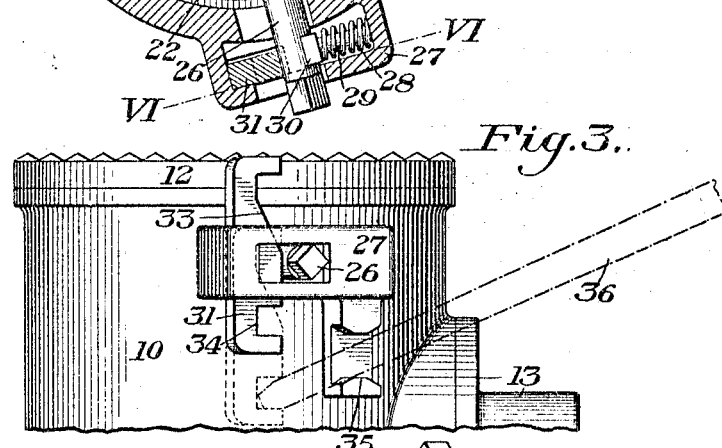
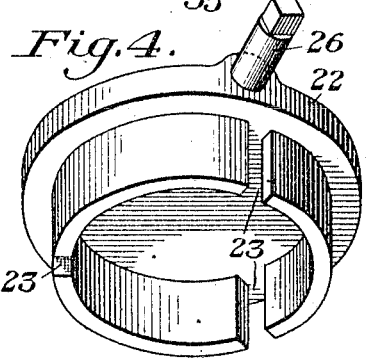
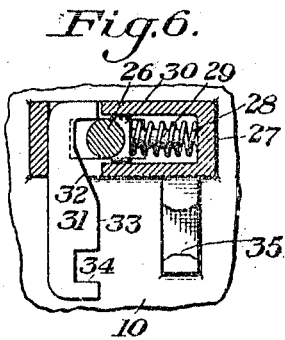
WITNESSES
R A Balderson
W F Amaries
INVENTOR
I. E. Hindman,
by Bakewell Byrnes Parmelee
Attys.

UNITED STATES PATENT OFFICE.

ISAIAH E. HINDMAN, OF CRAFTON, PENNSYLVANIA, ASSIGNOR TO THE DUFF MANUFACTURING COMPANY, OF PITTSBURGH, PENNSYLVANIA, A CORPORATION OF PENNSYLVANIA.

LIFTING-JACK.

1,054,413.  Specification of Letters Patent. Patented Feb. 25, 1913.

Application filed May 24, 1912. Serial No. 699,417.

*To all whom it may concern:*

Be it known that I, ISAIAH E. HINDMAN, a resident of Crafton, in the county of Allegheny and State of Pennsylvania, have invented a new and useful Improvement in Lifting-Jacks, of which the following is a full, clear, and exact description, reference being had to the accompanying drawings, forming part of this specification, in which—

Figure 1 is a vertical section showing a preferred form of my invention. Fig. 2 is a cross-section on the line II—II of Fig. 1. Fig. 3 is a partial side elevation showing a controlling device. Fig. 4 is a perspective view of the controlling ring. Fig. 5 is a detail of one of the clutch rollers, and Fig. 6 is a vertical section on the line VI—VI of Fig. 2.

My invention has relation to lifting jacks; and is more particularly applicable to jacks in which the lifting member when released will lower rapidly under the weight of the load.

The invention is designed to provide a simple and efficient fluid dash pot device for controlling the lowering movement.

In the accompanying drawing, I have shown the invention as applied to a high-speed screw jack of the type described and claimed in my co-pending application filed May 7th, 1912, Serial No. 695,729; but I desire it to be understood that the present invention is not limited to use in connection with this particular form of jack which is here shown for the purposes of illustration.

In the drawings, 2 represents the base of the jack having an upwardly projecting cylinder 3 provided with a head 4 having a central nut 5. The quick pitch screw stem 6 extends down through the nut and has rotary engagement with the piston 7 which is provided with a by-pass 8 extending through it and controlled by an upwardly seating ball valve 9.

Surrounding the cylinder 3 is the lifting shell 10 which may have a foot-lift 11 at one side thereof, and carries at its top the lifting plate 12. Extending through a bearing 13 in the side of the shell is an operating stud shaft 14 having a squared outer end 15 and carrying within the shell a bevel gear 16 intermeshing with horizontal bevel gear 17, which is keyed to the threaded shaft 6. Surrounding the stem of the bevel gear 17 is a steel friction ring and ball race 18, having an annular groove in its upper face to receive a row of balls 19 which are also received by the corresponding annular groove in the upper ball bearing plate 20. This ball bearing plate 20 is centered by a reduced extension 21 by the elevating screw.

Outside the friction ring 18, I place the controller 22, which is split at an odd number of points, as shown at 23, to receive rollers 24. These rollers are of greater diameter than the thickness of the ring and engage the friction ring 18 within them and curved cam faces 25$^a$ outside them, and formed on the inner surface of a cam ring 25 which is forced into the upper part of the shell with a press fit. There are, of course, as many cam surfaces 25$^a$ as there are rollers or anti-friction elements 24, and the cam faces are so positioned relative to the screw thread of the elevating screw that during lifting the friction of rotation tends to carry the anti-friction elements into released position at the deepest part of the cam grooves.

In order to cause the rollers or anti-friction clutch devices to stop backward movement and hold the load in any position to which it is raised, some kind of biasing device is necessary which will constantly tend to move the parts into clutching position. In the form shown, I accomplish this by providing a stem or pin 26 which is secured to the upper enlarged diameter portion of the controller ring 22, and projects outwardly through the shell. On this shell, I form a small casing 27, preferably by casting it integral with the casing, which contains a spring 28 surrounding the stem 29 of a bearing block 30 fitting the side of the pin 26. The spring has a constant tendency to turn the controller ring in a clockwise direction, looking at Fig. 2, and hence to force the rollers into clutching position. This will not cause the rollers to oppose the rotation in lifting, but will cause the rollers to constantly follow up the lifting movement and always be ready to engage and check any backward movement. In actual practice, it is found that no settling back can be discerned when the lifting is stopped. This feature is of great importance, because such jacks are usually operated with a ratchet lift and if a certain amount of lift is lost at each stroke, this means a large reduction in efficiency.

The controller ring and clutch device which I have just described may be used to advantage with any rapid action screw jack having a screw of such a pitch that the load will lower itself and the jack unless backward movement is stopped.

In this jack in order to lower it is only necessary to apply power to the shaft 14 in the reverse direction from that of lifting, which power will break the friction connection between the bevel gear 17 and its surrounding friction ring 18, thus allowing the rotation in the opposite direction and gradually lowering as desired. The parts are so designed that the friction between the bevel gear and its friction ring can never be overcome by any load within the range of the jack, thus preventing any accidental dropping of the jack on to the load.

The jack as thus far described, is similar to that which forms the subject-matter of my above referred to application. I will now describe the features which constitute the present invention.

In order to provide for the regulating of the load, and without any movement of the actuating gear, I provide the jack with a fluid dash pot device, and also the knock-off device, which completely releases the clutch of the jack and allows the load to descend by leakage of the oil or other liquid in the dash pot. To this end I fill the cylinder and bore of the casing with oil up to about the level shown in Fig. 1. The piston 7, while provided with packing rings, nevertheless has a relatively loose fit in the cylinder, so that under lowering pressure a considerable amount of oil will be forced around the piston and past its packing rings to permit descent of the outer shell. I also provide the by-pass passage 8ª leading outwardly from the upper portion of the cylinder and downwardly between the cylinder and rail to the base of the jack, and connecting by a port 8ᵇ with the passage 8ᶜ leading into the lower portion of the cylinder. A screw valve 8ᵈ is provided to control the port 8ᵇ and thereby regulate the amount of oil which will flow through the passages 8ª and 8ᶜ from one side of the piston to the other. In order to allow the load to force the shell downwardly, I also provide a knock-off device for the clutch or controller ring. In the form shown this coacts with the biasing device. It consists of a vertically movable wedge 31, having a wedge face 32, a straight face 33, and an engagement slot 34. This wedge slides within suitable slots in the casing 27, and the shell is provided with a suitable fulcrum or rest 35 to receive a lever, indicated in dotted lines at 36, which may be engaged with the wedge. When it is desired to allow the load to move down under the fluid control, the wedge is forced upwardly into the position shown in full lines in Fig. 3. This turns the controller ring to a position where the rollers are at the deepest parts of the cam grooves and are out of action, and holds them in this position. In this case, the friction ring will revolve as a part of the bevel wheel 17, and the load will push down the shells rapidly as the transfer of the fluid from the lower to the upper side of the piston will permit. During the lifting action the fluid will pass freely from above the piston to below the same, since the ball valve 9 in the piston head will drop in its seat.

It will be noted that the base is provided with the central hole, filled with screw plug 37, in the construction shown, thus providing for the proper machining of the inner surface of the cylinder. The oil may be filled in through a hole 38 in the top plate 12, which is closed by a screw plug 39.

The advantages of my invention will be obvious to those skilled in the art, since it provides a simple dash pot device of an effective character, by means of which the load may be lowered, as may be desired, and the lowering action controlled to a nicety.

While, as above indicated, my invention is particularly applicable to high-speed lifting jacks of the character described, it may obviously be adapted to various forms of such jacks other than the particular ones shown, and is also applicable to other types of jacks.

I claim:—

1. A high-speed lifting jack having a screw stem, a piston carried thereby, a stationary member containing a cylinder and a nut bearing for the screw stem, a clutch device for holding the screw stem against the action of the load, and a knock-off device for the clutch, the cylinder and the piston having a coöperating fluid dash pot device for controlling the lowering movement of the screw stem when the knock-off device is operated, substantially as described.

2. A lifting jack comprising a screw stem, a lifting head carried thereby, a lifting cylinder connected to the lifting head, a stationary cylinder inclosed by the lifting cylinder, and a piston carried by the screw stem and working in the stationary cylinder, said piston and stationary cylinder having a coöperating fluid dash pot device for controlling the lowering movement of the lifting member, substantially as described.

3. A high-speed lifting jack, comprising an elevating screw, a piston carried thereby, a cylinder in which the piston is arranged to work, a lifting cylinder connected to the lifting head and telescoping with the first named cylinder, and a controllable bypass passage around the piston in said cylinder, substantially as described.

4. A lifting jack comprising an elevating screw, a piston carried thereby, a cylinder in which the piston is arranged to work, said cylinder supporting a nut for the elevating screw, and coöperating dash pot devices carried by the piston and cylinder, said nut having fluid spaces therein communicating with the fluid space of said cylinder, substantially as described.

5. A lifting jack comprising an elevating screw, a lifting head, a lifting cylinder carried by said screw, a base carrying a stationary cylinder over which the lifting cylinder telescopically slides, gearing within said lifting cylinder for actuating the screw, a nut carried by the stationary cylinder and engaging the screw, a piston carried by the screw and working in the stationary cylinder, and the piston and the stationary cylinder having a fluid dash pot device for controlling the lowering movement of the screw, substantially as described.

6. A lifting jack comprising an elevating screw, means for actuating the screw, a fixed cylinder within which the lower portion of the screw extends, a piston carried by said screw and working in said cylinder, said piston having a port therethrough, and an upwardly seating check valve controlling said port, and the cylinder having a bypass passage connecting the upper and lower portions of the cylinder, and said passage having a controlling device, substantially as described.

7. A lifting jack comprising a lifting screw, a lifting head, a lifting cylinder carried by said screw, a base member having a stationary cylinder over which the lifting cylinder telescopically slides, said stationary cylinder having a nut member engaging the screw, a piston carried by the screw and working within the stationary cylinder, said piston and stationary cylinder forming a dash pot device for controlling the lowering movement of the screw, the nut having a fluid chamber therein communicating with the interior of said cylinder, and means for regulating the action of the dash pot device, substantially as described.

8. A lifting jack comprising a lifting screw, a lifting head, a lifting cylinder carried by said screw, and a base member having a stationary cylinder with which the lifting cylinder telescopes, there being a liquid space between a portion of the telescoping parts of the said cylinders, said space communicating with the interior of the first named cylinder, and said piston and cylinder forming a dash pot device, substantially as described.

In testimony whereof, I have hereunto set my hand.

ISAIAH E. HINDMAN.

Witnesses:
  GEO. H. PARMELEE,
  H. M. CORWIN.